No. 775,525. PATENTED NOV. 22, 1904.
C. W. DOUGHTY.
PROCESS OF NEUTRALIZING LIQUIDS EFFLUENT FROM WOOD PULP MILLS.
APPLICATION FILED MAR. 24, 1902.
NO MODEL.
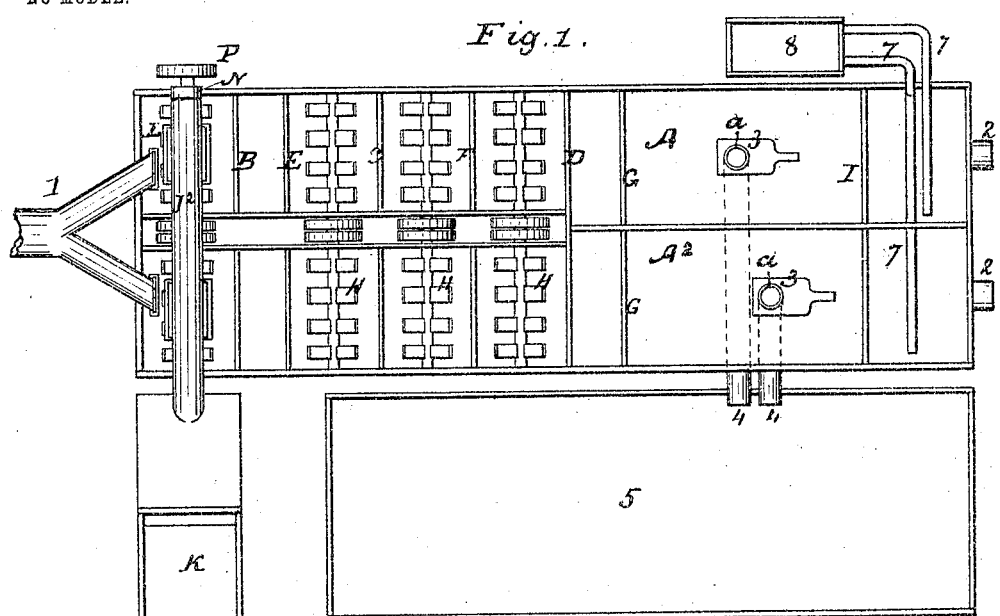
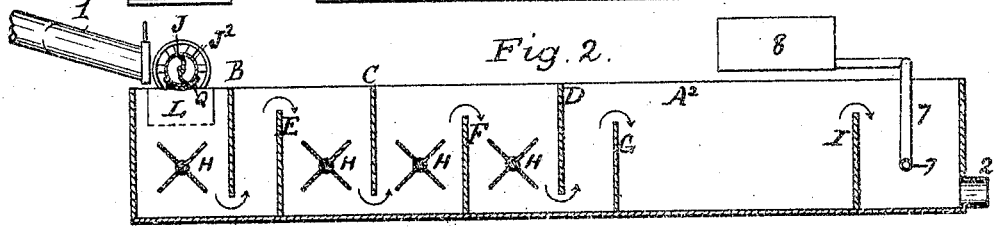
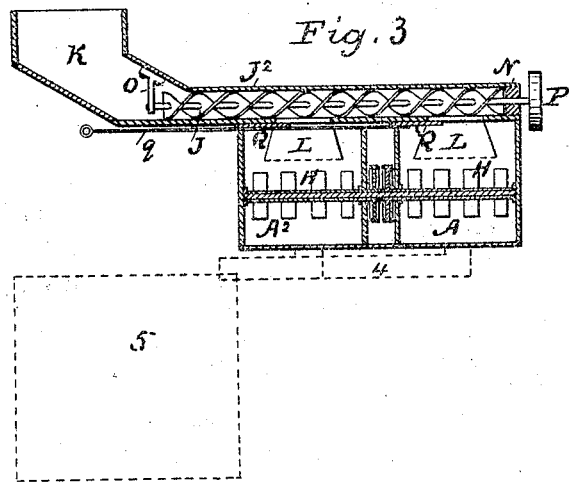
WITNESSES
R. H. Storm.
J. J. Masson
INVENTOR
Charles W. Doughty
by E. E. Masson
Attorney No. 775,525.

Patented November 22, 1904.

UNITED STATES PATENT OFFICE.

CHARLES W. DOUGHTY, OF AUGUSTA, GEORGIA.

PROCESS OF NEUTRALIZING LIQUIDS EFFLUENT FROM WOOD-PULP MILLS.

SPECIFICATION forming part of Letters Patent No. 775,525, dated November 22, 1904.

Application filed March 24, 1902. Serial No. 99,722. (No specimens.)

*To all whom it may concern:*

Be it known that I, CHARLES W. DOUGHTY, a citizen of the United States, residing at Augusta, in the county of Richmond and State of Georgia, have invented certain new and useful Improvements in Neutralizing Liquids Effluent from Wood-Pulp Mills, of which the following is a specification, reference being had therein to the accompanying drawings.

The objects of my invention are to decompose or remove sulfuric and sulfurous acids from the waste liquids effluent from wood-pulp of fiber-mills by neutralizing the acids and changing the character of said effluent into a harmless condition and a useful product by simple and inexpensive chemical means and mechanical devices, as hereinafter specified, reference being had to the accompanying drawings, in which—

Figure 1 represents a pair of partitioned tanks and agitators therein illustrating my invention. Fig. 2 is a longitudinal vertical section through one of said tanks. Fig. 3 is a transverse vertical section through the tanks, showing the marl-feeding conveyer and its hopper.

As above stated, my invention relates to the means and proportions of material for neutralizing the sulfuric and sulfurous acids in said waste liquids and their conversion wholly or in part into a material which is harmless in streams of water into which it may be discharged or which may be used as a liquid fertilizer, if desired. One of the materials consists of carbonate of lime, well dried and pulverized, obtained, preferably, from calcareous marl, although it may be obtained from limestone, chalk, or shells.

Carbonate of lime or marl neutralizes the acidity of the liquids due to sulfurous and sulfuric acids, which are injurious to growing plants, precipitating the acids as insoluble lime salts. To complete the neutralization and render the liquid alkaline, a small quantity of ammonia is added, the proportions being about one pound of dried and powdered marl and two ounces of ammonia to one thousand gallons of water.

In the accompanying drawings, A and $A^2$ represent two tanks side by side, which for a flow of five hundred thousand gallons in twenty-four hours of waste liquid from the digestors and the white water from pulp-washings may be each one four feet wide, four feet high, and fifty feet long. The tanks are intended to be used alternately; but they may be used together, the lower end of the conductor-pipe 1 being branched and provided with a sliding gate over each one of the tanks; but each tank is provided with an egress-pipe 2 at the lower portion of its outer end. Each tank is provided with a series of transverse hanging partitions B C D, which have a passage between their lower edge and the bottom of the tank, and a series of partitions E F G I, which are secured to the bottom of the tank, but do not extend as high as the upper edge of said tank to provide overflow-passages over said partitions. Within the chambers produced by said partitions are placed revolving agitators H, having paddles mounted upon horizontal shafts supported by the sides of the tanks, said shafts having pulleys in a narrow space between the tanks. Carbonate of lime, preferably calcareous marl, and also the waste liquid is introduced into the partitioned inlet end of the tank and the agitators thoroughly mix the marl and bring it in contact with the liquid. To continuously supply the marl into each tank in proper quantity, a screw conveyer J, placed in a tube $J^2$, is mounted over the tanks A and $A^2$. At one end of said tube there is a bin or hopper K, in which a sufficient quantity of marl is first placed and by the rotating conveyer is advanced over the tanks.

The outer end of the conveyer-tube is closed where its shaft passes through the box N a short distance from the driving-pulley P. The inner end of the conveyer-shaft is supported by a hanger O. To permit the marl to issue from the conveyer-tube into either one of the tanks, there are slots in the bottom of said tube which can be closed or their size regulated by sliding plates Q, lying against said tube and controlled by rods. The marl falls thence through tubes or hoppers L, the wire-netted bottom of which dips one inch or two in the water to prevent the escape of any of the powdered material.

In the tanks the cross-partitions E F G are gradually lower from the left side to the right side to preserve the gravity flow of the liquid; but the partition I is higher than the partition G to form dead water and cause the marl to be precipitated to the bottom of the tank. In said bottom there are openings $a$, closed by gates 3. When the gates are open, the openings $a$ lead by passages 4 to a suitably-located receptacle 5, which may be of large size, in which the sediment is allowed to settle. The exposure of said sediment to light and air desulfurizes it by decomposing the sulfid and sulfuret compounds of lime, and the marl can then be effectively used over and over again.

To remove any acid that may remain in the liquid beyond the settling-tank in front of the partition I, ammonia is directed into said liquid through small perforations of a pipe 7, located in the tank beyond the partition I. Said ammonia may be in liquid or gas form and proceed from a tank 8 suitably located.

Having now fully described my invention, I claim—

1. The method of neutralizing sulfite waste liquids which consists in directing said liquid through a tank having partitions to cause up-and-down motion of said liquid, bringing a continuous current of carbonate of lime into said liquid and agitating them together with ammonia added, substantially as described.

2. The method of neutralizing sulfite waste liquids which consists in directing said liquid through a tank having partitions to cause up-and-down motion of said liquid, bringing a current of carbonate of lime into said liquid, agitating them, allowing the heavy material to settle and adding ammonia to the liquid substantially as and for the purpose described.

3. The method of neutralizing sulfite waste liquid which consists in directing said liquid through a tank and giving to said liquid an up-and-down current motion in said tank, dropping dried and pulverized marl into said liquid, agitating them, causing the heavy material to settle and adding ammonia to the liquid substantially as described.

In testimony whereof I affix my signature in presence of two witnesses.

CHARLES W. DOUGHTY.

Witnesses:
PATRICK KANE,
C. B. VASTINE.